US011073991B2

(12) United States Patent
Hegde

(10) Patent No.: US 11,073,991 B2
(45) Date of Patent: Jul. 27, 2021

(54) DYNAMICALLY LINKING OBJECTS IN AN OBJECT STORAGE DURING UPLOADS TO CLOUD

(71) Applicant: International Business Machines Corporation, Armonk, NY (US)

(72) Inventor: Harsha Hegde, Buffalo Grove, IL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 300 days.

(21) Appl. No.: 16/365,319

(22) Filed: Mar. 26, 2019

(65) Prior Publication Data

US 2020/0310656 A1 Oct. 1, 2020

(51) Int. Cl.
*G06F 3/06* (2006.01)
*H04L 29/08* (2006.01)

(52) U.S. Cl.
CPC .......... *G06F 3/0611* (2013.01); *G06F 3/064* (2013.01); *G06F 3/067* (2013.01); *H04L 67/02* (2013.01); *H04L 67/1097* (2013.01)

(58) Field of Classification Search
CPC ........ G06F 3/0611; G06F 3/064; G06F 3/067; H04L 67/02; H04L 67/1097
See application file for complete search history.

(56) References Cited

U.S. PATENT DOCUMENTS

| | | |
|---|---|---|
| 5,787,442 A | 7/1998 | Harcherl et al. |
| 5,913,032 A | 6/1999 | Schwartz et al. |
| 6,401,101 B1 | 6/2002 | Britton et al. |
| 7,325,160 B2 * | 1/2008 | Tsao ................. G06F 8/71 714/15 |
| 7,343,412 B1 | 3/2008 | Zimowski |
| 2015/0006584 A1 | 1/2015 | Chien et al. |
| 2015/0301903 A1 * | 10/2015 | Mutha ............. G06F 11/1453 707/692 |

OTHER PUBLICATIONS

Deutsch et al.; Storing Semistructured Data with STORED; Proceedings of the 1999 ACM SIGMOD International Conference on Management of Data (SIGMOD '99); 1999; pp. 431-442.

Lagoze et al.; Fedora: An Architecture for Complex Objects and their Relationships, International Journal on Digital Libraries 6; No. 2; 2006; pp. 124-138.

* cited by examiner

*Primary Examiner* — Arvin Eskandarnia
(74) *Attorney, Agent, or Firm* — Anthony England; Andrew D. Wright; Roberts Calderon Safran & Cole, P.C.

(57) ABSTRACT

A method begins by receiving a data access request regarding a data object. The method continues by determining whether the data object is a primary data object. When the data object is the primary data object, the method continues by identifying one or more other data objects based on information associated with the data object. The method continues by sending a modified data object retrieval request regarding the data object and the one or more other data objects to a storage entity, where the modified data object retrieval request includes a modified header. The method continues by receiving a modified data object retrieval response from the storage entity that includes a modified response header and a modified response body that includes the primary data object and the one or more other data objects. The method continues by outputting the data object and the one or more other data objects.

20 Claims, 8 Drawing Sheets

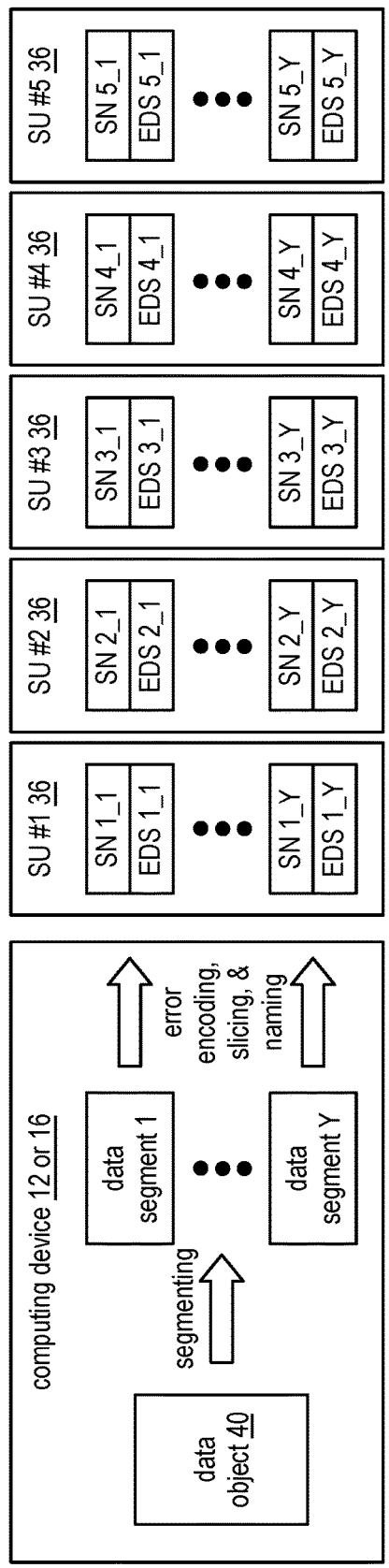
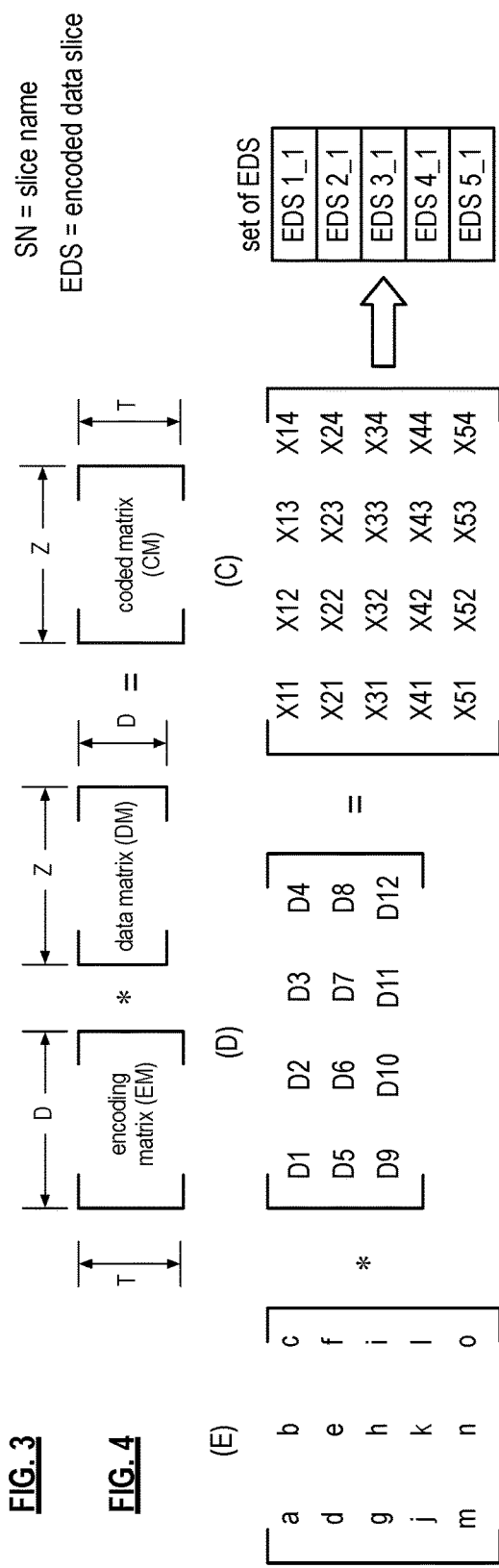
FIG. 3
FIG. 4
FIG. 5
FIG. 6

DYNAMICALLY LINKING OBJECTS IN AN OBJECT STORAGE DURING UPLOADS TO CLOUD

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to storage and retrieval of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
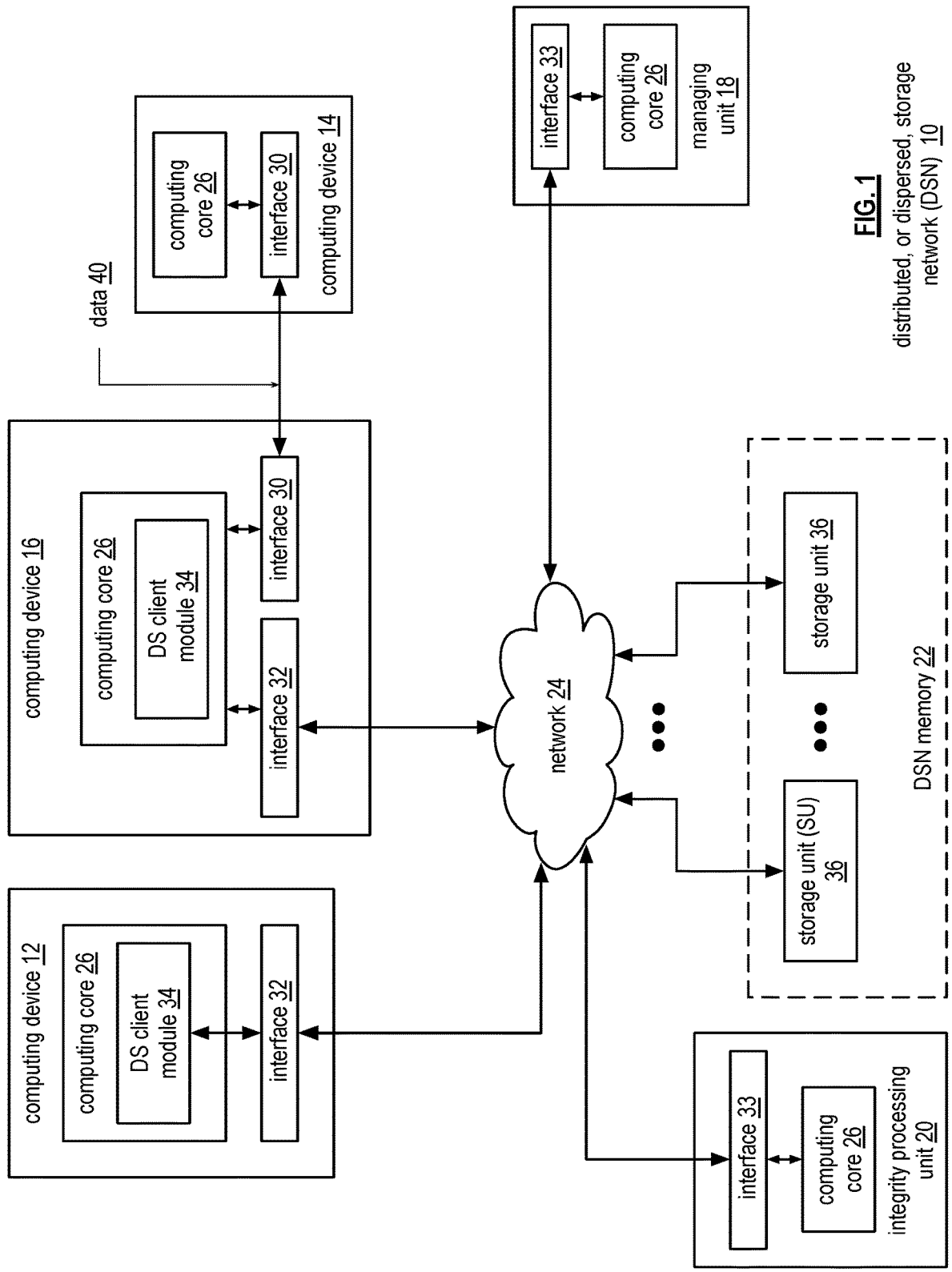
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12 -16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
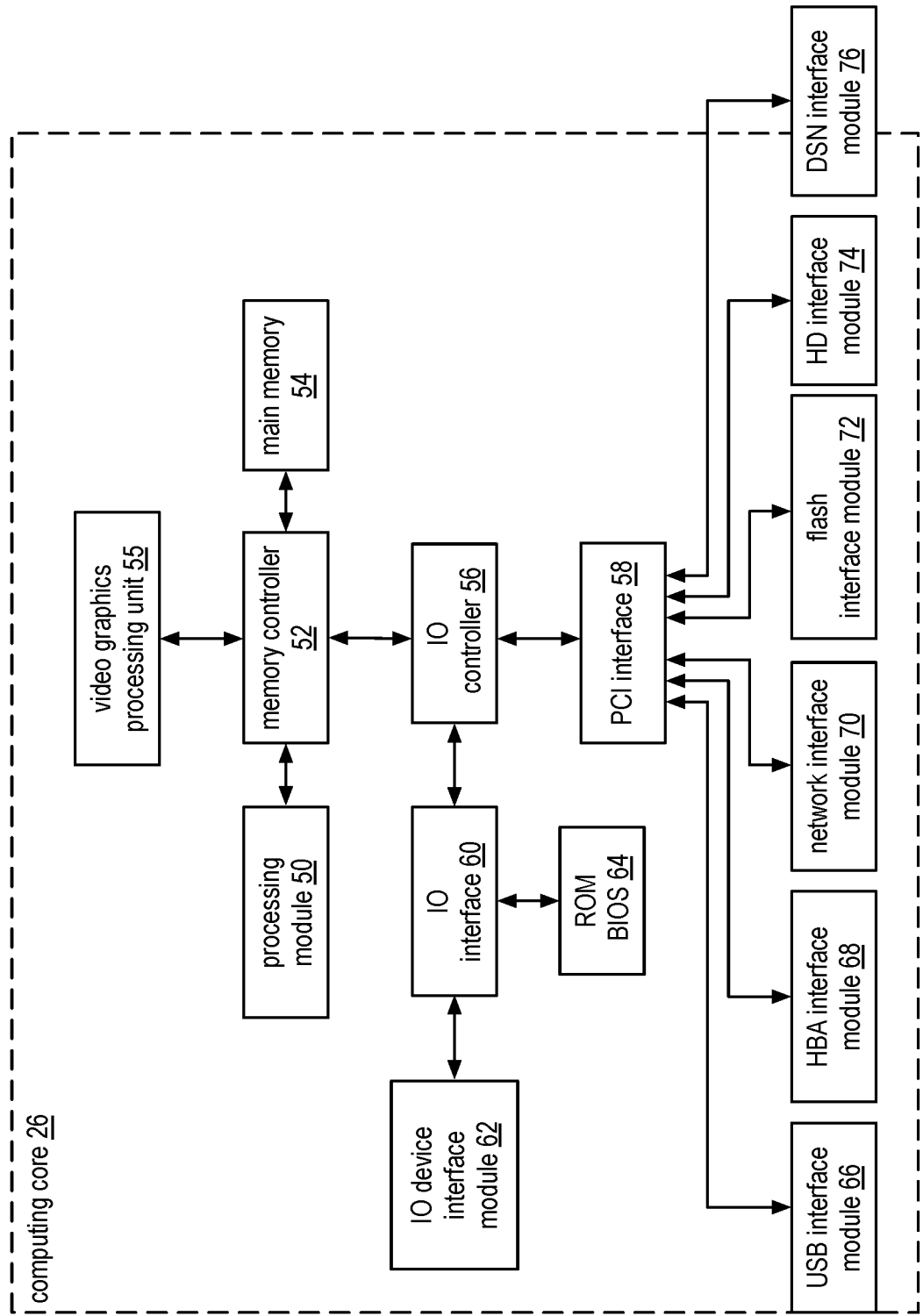
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data (e.g., data 40) on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 78 is shown in FIG. 6. As shown, the slice name (SN) 78 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
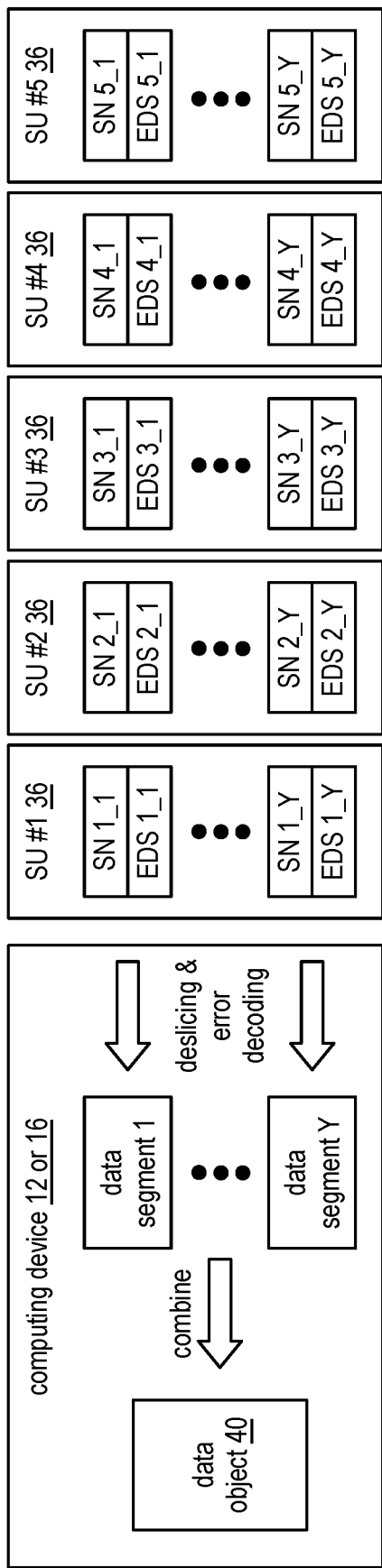
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
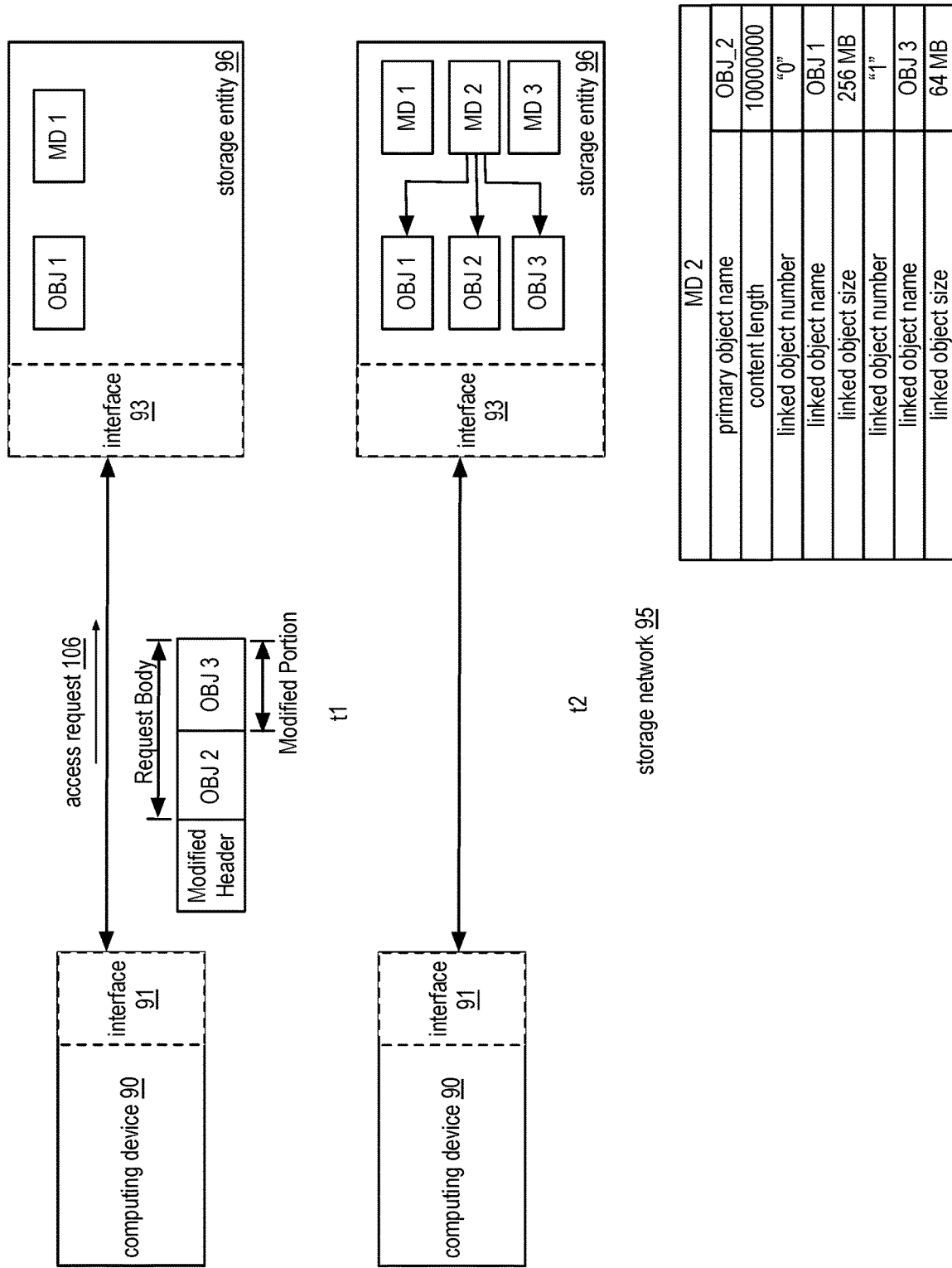
FIG. 9A is a schematic block diagram of an embodiment of an example of storing data in a storage network in accordance with the present invention.

FIGS. 9A and B are schematic block diagrams of embodiments of a storage network 95 that includes a computing device 90 and a storage entity 96. The computing device 90 includes an interface 91. The storage entity includes an interface 93. Note that the computing device 90 may be implemented by one of a computing device 12-16, a managing unit 18, an integrity processing unit 20 of FIG. 1, and the DS processing unit 102 of FIG. 10. The storage entity may be implemented by one or more of the storage units 36 of FIG. 1. For example, the storage entity may be a set of storage units. As another example, the storage entity may be a plurality of sets of storage units. Note that while not explicitly shown, the communication between the computing device and the storage entity may be performed via the network 24 of FIG. 1. In one embodiment, the interfaces 91 and 93 are implemented by an application program interface (API). Further note that in one example, the API is implemented at least partially separate from the computing device 90 and/or the storage entity 96.

The API may operate according to a specific architecture. As an example, an API utilizes a representational state transfer (REST) architecture. The REST API may rely on a protocol for communicating between devices. For example, the REST API relies on a hyper-text transfer protocol (HTTP). The communication (e.g., access request 106, access response 108) may also include a particular format. For example, in a RESTful web service, the format may include one or more of Hyper Text Markup Language (HTML), Extensible Markup Language (XML) and JavaScript Object Notation (JSON).

The HTTP protocol may each support various types of requests for communication. For example, a GET request retrieves data from a specified resource. As another example, a POST request submits data to be processed to a specified resource. As yet another example, a PUT request updates a specified resource. The storage network may also support various API operations. As a specific example, the storage network supports a subset of Amazon® Simple Storage Service (Amazon S3) API operations. As an example, the storage network supports a PUT Object request, which adds an object to a bucket (e.g., object storage, storage resource, etc.). As another example, the storage network supports a POST Object request, which adds an object to a bucket using HTML forms.

FIG. 9A is an example of storing an object in the storage network 95. In this example, the communication of the computing device 90 and the storage entity 96 is in accordance with an object retrieval protocol of the storage network for a single data object (e.g., the protocol for a conventional data access request). At a first time t1, the computing device sends access request 106 (e.g., a write request) to store one or more data objects in the storage entity 96. The access request 106 includes a modified header as compared to a conventional write request, a modified body as compared to a conventional write request and metadata. In one example (e.g., FIG. 9A), the computing device adds metadata to the primary object while at least some of the plurality of objects are being written to the storage entity. In another example, the computing device adds metadata to the primary object after one or more of the plurality of objects have been stored in the storage entity.

For example, the modifier header includes additional fields and/or headers that define a name of the primary data object and one or more linked objects. For instance, an additional header is added to define the name of the primary object and/or the linked objects. In another example, an existing header is changed to include additional information. For instance, a content-size header is modified to include the total size of all of the objects (e.g., the primary object and the one or more other objects). The objects are then able to be stored distinctly and be associated via the metadata of the primary object.

The content of the primary object and the one or more other linked objects are concatenated in the request. For example, object 2 (e.g., the primary data object) is concatenated with object 3 (the linked data object). In addition, the metadata (e.g., MD 2) defines the linking relationship with the one or more other linked objects. For example, as illustrated MD 2 links object 2 to object 1, which has a size of 256 megabytes (MBs) and is linked object number "0" and links object 2 to object 3, which has a size of 64 MBs and is linked object number "1". Thus, at a second time t2, the data objects 1-3 are stored in the storage entity 96 and metadata MD 2 defines the linking of data object 2 with data objects 1 and 3.

Note in a conventional write request (e.g., when the access request does not include a modified header, when the access request is not requesting storing a primary data object, etc.), the computing device would send a conventional header and a request body that includes only the primary object (e.g., OBJ 2). Thus, the computing device would have to send an individual request to store the primary object and each of the one or more linked objects.

As a specific example an access request, when the access request is a PUT OBJECT request:
1. Headers:
PUT/PrimaryObject HTTP/1.1
Host: bluemix.ibm.com
Date: UTC date
Authorization: <string>
ibm-cos-linked-objects: object#1, size#1, object#2, size#2, object#n, size#n
ibm-cos-primary-object: <default OR name of existing object in storage>
2. Body

```
<Primary object-optional if the object does not exist in
storage><object#1><object#2>
<object#n>EOF
```

The size of the primary object can be computed from the total content size in the header and the size of the individual linked objects provided as follows, when the primary object is also being stored.

Content size—sum of all linked object sizes

The linked objects may then be stored as independent objects with their own metadata in the same way other independent objects are stored in the storage network.
3. Metadata of Primary Object The metadata of the primary object, in addition to containing fields such as size, created time, last access time, region name and segment name, could also contain the linked objects.

As an example of a metadata format:

```
{
"format": 2,
"name": <primary object name>
"last_modified": "1436317160062",
"last_changed": "1436317160062",
"last_touched": "1436317160062",
"content_length": "10000000",
"content_regions":
"linked_objects": {
"0": {
"name": <name>
"size": <size>
}
}
}
```

Figure 9B:
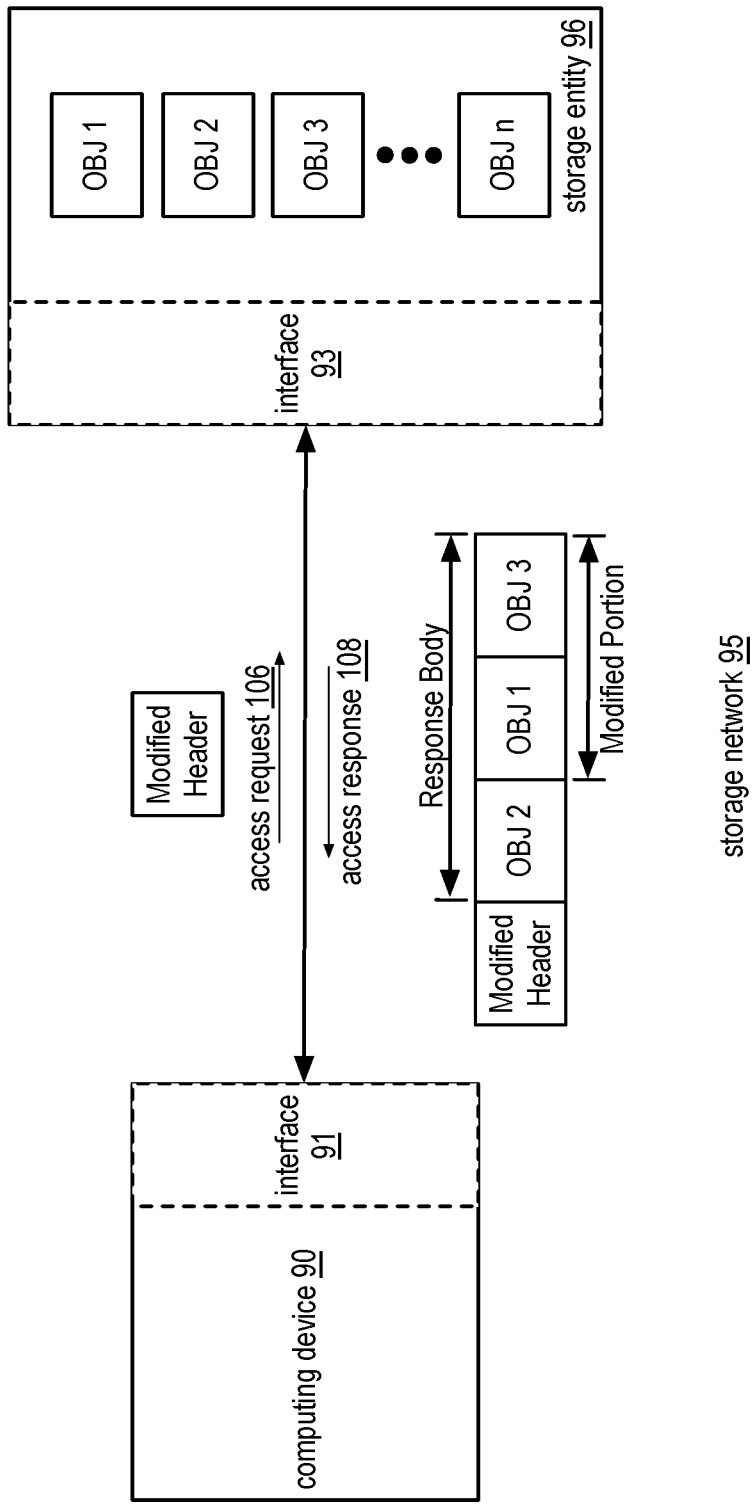
FIG. 9B is a schematic block diagram of an embodiment of an example of retrieving data in a storage network in accordance with the present invention.

FIG. 9B an example of operation of retrieving data objects stored in storage entity 96. In one example, the data objects are complex objects (e.g., objects that have references to other objects (e.g., object 2 of FIG. 9A) in the storage network 95 and/or another storage network). In this example, the communication of the computing device 90 and the storage entity 96 is in accordance with an object retrieval protocol of the storage network for a single data object.

In an example, a relationship between a plurality of objects stored in the storage entity is defined in the metadata.

For example, the computing device updates or creates metadata of a primary object is that defines the relationship (e.g., linking) with one or more other data objects. The metadata is discussed in greater detail with reference to FIGS. 9A and 10-11. The linking allows for tracking the relationship of a plurality of objects in the storage network.

As illustrated, the access request 106 (e.g. a read request) includes a modified header and the access response 108 (e.g. read response) includes a modified header and a response body that includes a modified portion (e.g., modified body as compared to a conventional access response within the storage network). For example, the modified header in the access response 108 includes information regarding the primary object and the linked objects (e.g., identification of the primary object and the linked objects, the names of the primary object and the linked objects and the sizes of the primary object and the linked objects). The response body includes the primary data object and a modified body portion that includes one or more linked objects.

As a specific example, the access request 106 includes a modified header requesting a first object (e.g., OBJ 2), which is a primary object. The access request may also include identity of one or more linked objects or an indication that the second object is a primary object. The storage entity receives the access request 106 through its interface 93 and determines (e.g., based on the indication, based on metadata associated with the primary object stored in the storage entity, based on a command, etc.) the request is for a primary object (e.g., OBJ 2).

Having determined that the data object is a primary object, the storage entity responds with an access response 108 that includes a modified header and a modified body (e.g., response body that includes a modified portion as compared to a conventional response body). The modified body includes the primary object (e.g., OBJ 2) and one or more linked objects (e.g., OBJ 1 and OBJ 3). Note in a conventional response (e.g., when the access request does not include a modified header, when the access request is not requesting a primary data object, etc.), the storage entity would respond with a conventional header and a response body that includes only the first object (e.g., OBJ 1). Thus, the computing device would have to send an individual request for each of the one or more linked objects.

Figure 10:
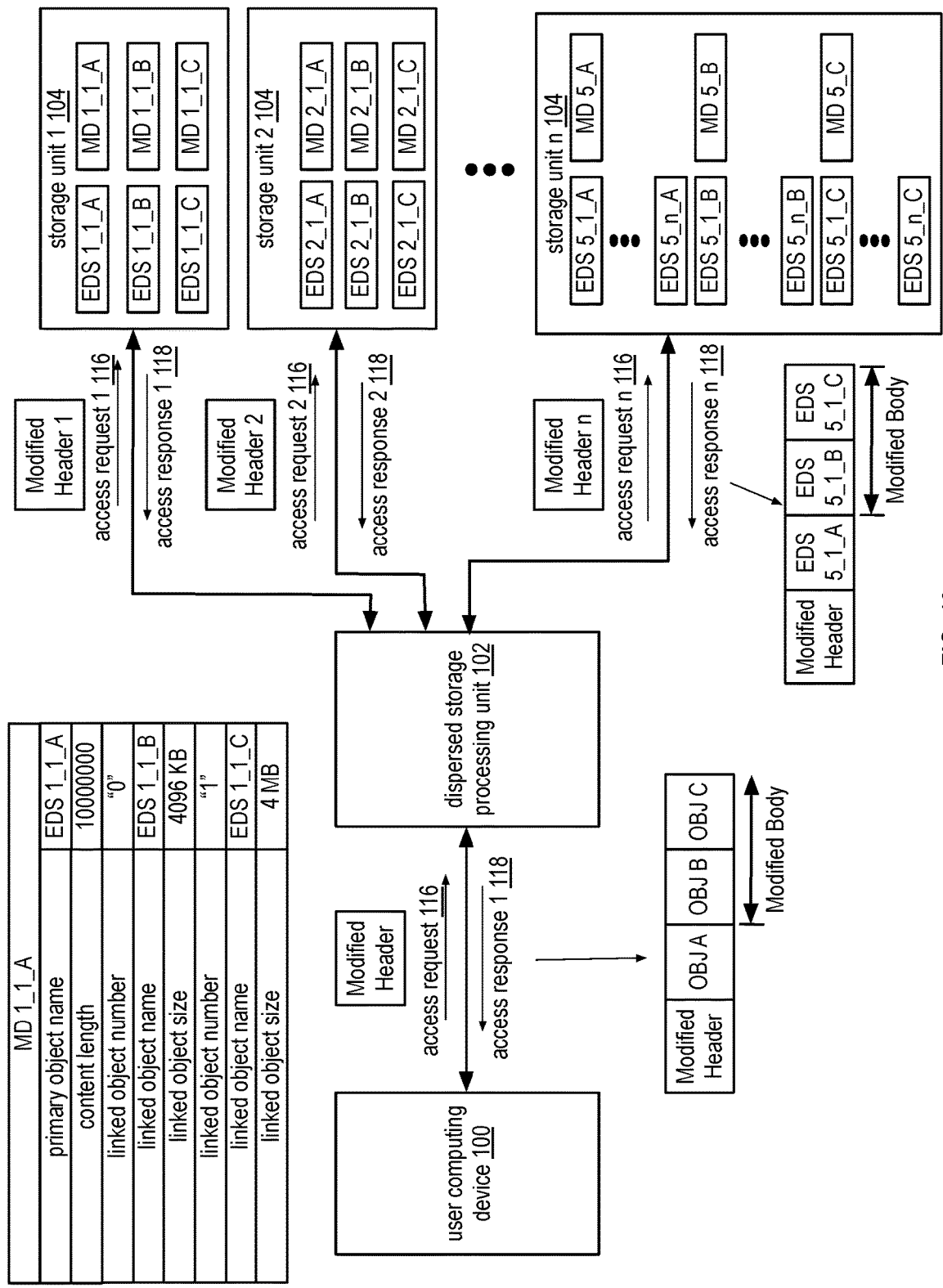
FIG. 10 is a schematic block diagram of another embodiment of a dispersed storage network (DSN) in accordance with the present invention.

FIG. 10 is a schematic block diagram of another embodiment of a dispersed storage network (DSN) that includes a user computing device 100, a dispersed storage (DS) processing unit 102, and storage units 1-$n$ 104. The user computing device 100 may be implemented by one of a computing device 12-16 of FIG. 1. The DS processing unit 102 may be implemented by a computing device 16 of FIG. 1. The storage units 104 (e.g., storage entity) may each be implemented by a storage unit 36 of FIG. 1. In one example, the DSN operates in a similar manner as the storage network of FIG. 9. Note, that also similar to the discussion of FIG. 9, each of the user computing device 100, the dispersed storage processing unit 102, and the storage units may include an interface (e.g., an API) to facilitate communication within the DSN.

Also shown is an example of metadata MD 1_1_A. In one example, the metadata stored in the DSN corresponds to an encoded data slice (e.g., EDS 1_1_A as shown in storage unit 1 104). In another example, the metadata also corresponds to other encoded data slices of a group of encoded data slices (e.g., EDS 1_2_A through EDS 1_$n$_A). In another example, the metadata also corresponds to other encoded data slices of one or more other set of encoded data slices (e.g., EDS 1_1_B through EDS 5_$n$_B, EDS 1_1_C through EDS 5_$n$_C). The metadata includes a plurality of fields that includes information regarding one or more of the primary data object (a plurality of data segments, a plurality of sets of encoded data slices) and linking information of one or more other data objects (e.g., one or more other data segment, one or more other pluralities of sets of encoded data slices).

As a specific example, metadata for EDS 1_1_A includes a primary object name of "A", a content length of "10000000", a first linked object number "0", a first linked object name "EDS 1_1_B", a linked object size of "4096 KB", a second linked object number of "1", a linked object name of "EDS_1_1_C" and a second linked object size of "4 MB". Thus, the encoded data slices 1_1_A indicates object A is linked to one or more encoded data slices of object B and one or more encoded data slices of object C. Note the metadata may include one or more additional fields. For example, the metadata includes one or more of a format field, a last modified field, a last changed field, a last touched field, and a content regions field. Further note, in one example, the metadata links at one or more of the encoded data slice level, the data segment level and the data object level.

In an example of operation, the user computing device 100 sends an access request 116 for a data object "A" to the dispersed storage processing unit 102. In one example, the access request 116 includes a modified header which includes one or more additional header fields and/or one or more modified fields as compared to a conventional header. The DS processing unit 102 then determines whether the data object "A" is a primary data object (e.g., references one or more other data objects).

In one example of the determining, the DS processing unit 102 determines the data object is a primary data object when the header is not a conventional header (e.g., is modified). As another example, the DS processing unit 102 determines the data object "A" is a primary data object when the access request 116 includes an indication the data object "A" is a primary data object. As yet another example, the DS processing unit determines the data object "A" is the primary data object by obtaining metadata regarding at least a portion (e.g., a data segment, an encoded data slice) of the data object "A" and determining the metadata indicates the data object "A" is a primary data object (e.g., is linked to one or more other data objects, is linked to one or more other data segments, is linked to one or more other sets of encoded data slices).

When the DS processing unit 102 determines the data object "A" is the primary data object, the DS processing unit 102 identifies one or more other data objects (e.g., where a data object is stored as a plurality of sets of encoded data slices, and a data segment of the data is stored as a set of encoded data slices of the plurality of sets of encoded data slices) based on the information (e.g., metadata) associated with the data object "A". The DS processing unit 102 then sends a set of modified data object retrieval requests 1-$n$ 116 (e.g., access requests 1-$n$ 106) regarding the primary data object and the one or more other data objects (e.g., object B and C) to the set of storage units 1-$n$ 104. In this example, each of the data objects A, B and C have been dispersed storage error encoded into a plurality of sets of encoded data slices (e.g., EDS 1_1_A-1_$n$_A, EDS 2_1_B-2_$n$_B, and EDS 5_1_C-5_$n$_C). Note for ease of illustration purposes, the set of encoded data slices in storage units 1 and 2 are notated by the first EDS of each set. Further note, in this example, the pillar width number is 5 and the decode threshold number is 3.

The set of modified data object retrieval requests 1-n 116 each include a respective modified header that includes an identity of encoded data slices associated with the primary data object (e.g., object A) and linking to other encoded data slices associated with the one or more other data objects (e.g., objects B and C). For example, access request 1 116 includes a slice name regarding at least some encoded data slices of object A (e.g., EDS 1_1_A-EDS 1_5_ A) and linking information regarding slice names of at least some encoded data slices of object B and C (e.g., EDS 1_1_B-1_5_B, EDS 1_1_C-1_5_C) that are stored in storage unit 1 104.

The DS processing unit 102 receives at least some access responses 1-n 118 from at least some of the storage units 104 in response to the set of access requests 1-n 116. The access responses each include a modified header and a modified body when compared to a conventional response. The modified header includes identity (e.g., name, size of primary encoded data slice, total size of all encoded data slices, etc.) of the encoded data slices associated with primary data object and linking (e.g., name, size, etc.) to the one or more other encoded data slices (e.g., of objects B and C). The modified body includes encoded data slices associated with the one or more other data objects.

When a decode threshold number (e.g., 3) of encoded data slices for each data segment of the data object is received, the DS processing unit 102 decodes each of the decode threshold number of encoded data slices for each data object to reconstruct data objects A, B and C (or reconstruct each data segment of each data object A, B and C). Alternatively, the DS processing unit may send one or more of the decode threshold number of encoded data slices of one or more of sets of encoded data slices to another DS processing unit and/or another computing device for decoding and/or further processing.

Having reconstructed the data objects A, B, and C, the DS processing unit 102 sends an access response 118 to the user computing device 100 that includes a modified header and data objects A, B and C.

Figure 11:
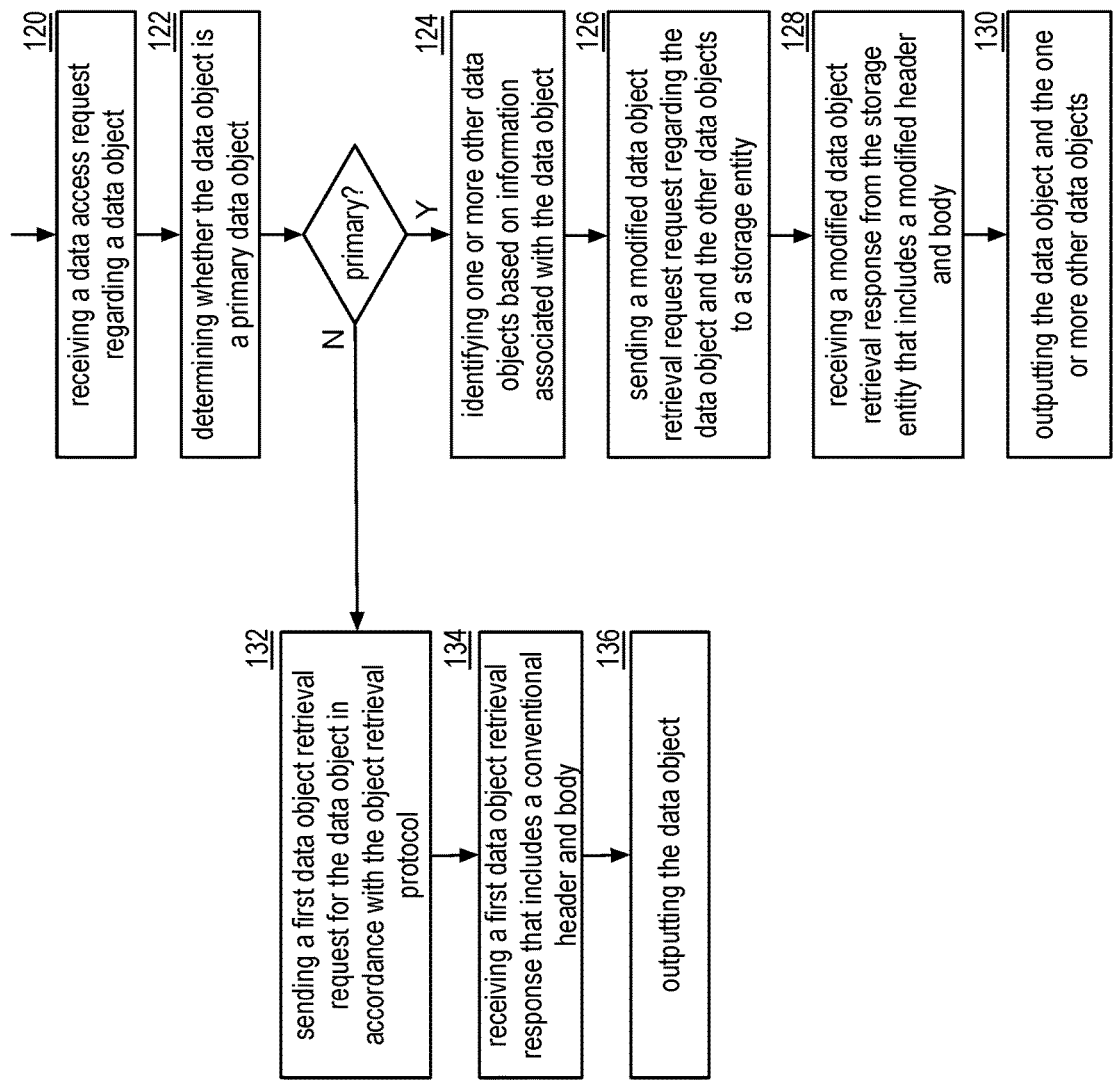
FIG. 11 is a flowchart illustrating an example of a method of dynamically linking objects in accordance with the present invention.

FIG. 11 is a flowchart illustrating an example of a method of dynamically linking objects. The method begins or continues at step 120, where a computing device receives a data access request, where the data access request is regarding a data object. In an example, the data object is a Hyper Text Markup Language (HTML) web page. The method continues with step 122, where the computing device determines whether the data object is a primary data object. The primary data object references one or more other data objects. In an example, the one or more other data objects are one or more multimedia objects (e.g., images, videos, graphics, other web pages, etc.). When the data object is the primary data object, the method continues to step 124. In an example of the determining the data object is the primary data object, the computing device accesses metadata of the data and interprets the metadata to determine whether the data object is the primary data object.

When the data object is not the primary data object, the method branches to step 132, where the computing device sends a first data object retrieval request for the data object in accordance with the object retrieval protocol. The first data object retrieval request includes a conventional header according to the object retrieval protocol for the data object. The method continues with step 134, where the computing device receives a first data object retrieval response that includes a conventional response header and a conventional body. The method continues with step 136, where the computing device outputs the data object. For example, the computing device displays the data object on a display of the computing device. As another example, the computing device sends the data object to another computing device.

When the data object is the primary data object, the method continues at step 124, where the computing device identifies the one or more other data objects based on information associated with the data object. For example, the information is metadata regarding the data object and the one or more other data objects. In an embodiment, the metadata includes one or more of the linking of the data object to the one or more other data objects, a size, a created time, a last access time, a region name, a segment name, a pillar width number, a decode threshold number, and a source name.

The method continues with step 126, where the computing device sends a modified data object retrieval request regarding the data object and the one or more other data objects to a storage entity of the storage network. Note that a data object retrieval request is in accordance with an object retrieval protocol of the storage network for retrieval of a single data object, and the modified data object retrieval request includes a modified header with respect to the data object retrieval request. The modified header includes an identity of the primary data object and linking to the one or more other data objects. In one example, the modified header includes a size for the data object and the one or more other data objects. Note in an example, a conventional header includes the size of the single data object.

The method continues with step 128, where the computing device receives a modified data object retrieval response from the storage entity, where a data object retrieval response is in accordance with the object retrieval protocol regarding the single data object, and the modified data object retrieval response includes a modified response header and a modified response body with respect to the data object retrieval response. The modified response header includes an identity of the primary data object and identity of the one or more other data objects, where the modified response body includes the primary data object and the one or more other data objects. The method continues with step 130, where the computing device outputs the data object and the one or more other data objects.

In one example, the storage network is a dispersed storage network (DSN) and the storage entity is a set of storage units. Note a computer readable storage medium that includes one or more elements that store operational instructions that when executed by a computing device, is operable to perform any of the above methods.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/ or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   receiving, by a first computing device of a storage network, a data access request, wherein the data access request is regarding a data object;
   determining, by the first computing device, whether the data object is a primary data object, wherein the primary data object references one or more other data objects;
   when the data object is the primary data object:
   identifying, by the first computing device, the one or more other data objects based on information associated with the data object;
   sending, by the first computing device, a modified data object retrieval request regarding the data object and the one or more other data objects to a storage entity of the storage network, wherein a data object retrieval request is in accordance with an object retrieval protocol of the storage network for retrieval of a single data object, wherein the modified data object retrieval request includes a modified header with respect to the data object retrieval request, wherein the modified header includes identity of the primary data object and linking to the one or more other data objects;
   receiving, by the first computing device, a modified data object retrieval response from the storage entity, wherein a data object retrieval response is in accordance with the object retrieval protocol regarding the single data object, wherein the modified data object retrieval response includes a modified response header and a modified response body with respect to the data object retrieval response, wherein the modified response header includes identity of the primary data object and identity of the one or more other data objects, wherein the modified response body includes the primary data object and the one or more other data objects; and
   outputting, by the first computing device, the data object and the one or more other data objects.

2. The method of claim 1 further comprises:
   when the data object is not the primary data object:
   sending, by the first computing device, a first data object retrieval request for the data object in accordance with the object retrieval protocol, wherein the first data object retrieval request includes a conventional header according to the object retrieval protocol for the data object;
   receiving, by the first computing device, a first data object retrieval response that includes a conventional response header and a conventional body; and
   outputting, by the first computing device, the data object.

3. The method of claim 1, wherein the data object is a hypertext markup language (HTML) web page and the one or more other data objects are one or more multimedia objects referenced by the HTML web page.

4. The method of claim 1, wherein the information associated with the data object comprises:
   metadata regarding the data object and the one or more other data objects, wherein the metadata includes one or more of:
   the linking of the data object to the one or more other data objects;
   a size;
   a created time;
   a last access time;
   a region name;
   a segment name;
   a pillar width number;
   a decode threshold number; and
   a source name.

5. The method of claim 1, wherein the modified header includes a size for the data object and the one or more other data objects, and wherein the conventional header includes the size of the single data object.

6. The method of claim 1, wherein the determining the data object is the primary data object comprises:
   accessing metadata of the data object; and
   interpreting the metadata to determine the data object is the primary data object.

7. The method of claim 1, wherein the storage network is a dispersed storage network (DSN) and the storage entity is a set of storage units of the DSN.

8. A computing device of a storage network comprises:
   memory;
   an interface; and
   a processing module operably coupled to the memory and the interface, wherein the processing module is operable to:
   receive, via the interface, a data access request, wherein the data access request is regarding a data object;
   determine whether the data object is a primary data object, wherein the primary data object references one or more other data objects;
   when the data object is the primary data object:
   identify the one or more other data objects based on information associated with the data object;
   send, via the interface, a modified data object retrieval request regarding the data object and the one or more other data objects to a storage entity of the storage network, wherein a data object retrieval request is in accordance with an object retrieval protocol of the storage network for retrieval of a single data object, wherein the modified data object retrieval request includes a modified header with respect to the data object retrieval request, wherein the modified header includes identity of the primary data object and linking to the one or more other data objects;

receive, via the interface, a modified data object retrieval response from the storage entity, wherein a data object retrieval response is in accordance with the object retrieval protocol regarding the single data object, wherein the modified data object retrieval response includes a modified response header and a modified response body with respect to the data object retrieval response, wherein the modified response header includes identity of the primary data object and identity of the one or more other data objects, wherein the modified response body includes the primary data object and the one or more other data objects; and output, via the interface, the data object and the one or more other data objects.

9. The computing device of claim 8, wherein the processing module is further operable to:

when the data object is not the primary data object:

send, via the interface, a first data object retrieval request for the data object in accordance with the object retrieval protocol, wherein the first data object retrieval request includes a conventional header according to the object retrieval protocol for the data object;

receive, via the interface, a first data object retrieval response that includes a conventional response header and a conventional body; and output, via the interface, the data object.

10. The computing device of claim 8, wherein the data object is a hypertext markup language (HTML) web page and the one or more other data objects are one or more multimedia objects referenced by the HTML web page.

11. The computing device of claim 8, wherein the information associated with the data object comprises:

metadata regarding the data object and the one or more other data objects, wherein the metadata includes one or more of:

the linking of the data object to the one or more other data objects;

a size;

a created time;

a last access time;

a region name;

a segment name;

a pillar width number;

a decode threshold number; and a source name.

12. The computing device of claim 8, wherein the modified header includes a size for the data object and the one or more other data objects, and wherein the conventional header includes the size of the single data object.

13. The computing device of claim 8, wherein the processing module is operable to determine the data object is the primary data object by:

accessing metadata of the data object; and interpreting the metadata to determine the data object is the primary data object.

14. The computing device of claim 8, wherein the computing device is a dispersed storage (DS) processing unit, the storage network is a dispersed storage network (DSN), and the storage entity is a set of storage units of the DSN.

15. A computer readable storage medium of a storage network comprises:

a first memory section for storing operational instructions, that when executed by a computing device, causes the computing device to:

receive a data access request, wherein the data access request is regarding a data object;

a second memory section for storing operational instructions, that when executed by the computing device, causes the computing device to:

determine whether the data object is a primary data object, wherein the primary data object references one or more other data objects;

a third memory section for storing operational instructions, that when executed by the computing device, causes the computing device to:

when the data object is the primary data object:

identify the one or more other data objects based on information associated with the data object;

send a modified data object retrieval request regarding the data object and the one or more other data objects to a storage entity of the storage network, wherein a data object retrieval request is in accordance with an object retrieval protocol of the storage network for retrieval of a single data object, wherein the modified data object retrieval request includes a modified header with respect to the data object retrieval request, wherein the modified header includes identity of the primary data object and linking to the one or more other data objects;

receive a modified data object retrieval response from the storage entity, wherein a data object retrieval response is in accordance with the object retrieval protocol regarding the single data object, wherein the modified data object retrieval response includes a modified response header and a modified response body with respect to the data object retrieval response, wherein the modified response header includes identity of the primary data object and identity of the one or more other data objects, wherein the modified response body includes the primary data object and the one or more other data objects; and output the data object and the one or more other data objects.

16. The computer readable storage medium of claim 15 further comprises:

a fourth memory section for storing operational instructions, that when executed by the computing device, causes the computing device to:

when the data object is not the primary data object:

send a first data object retrieval request for the data object in accordance with the object retrieval protocol, wherein the first data object retrieval request includes a conventional header according to the object retrieval protocol for the data object;

receive a first data object retrieval response that includes a conventional response header and a conventional body; and output the data object.

17. The computer readable storage medium of claim 15, wherein the data object is a hypertext markup language (HTML) web page and the one or more other data objects are one or more multimedia objects referenced by the HTML web page.

18. The computer readable storage medium of claim 15, wherein the information associated with the data object comprises:

metadata regarding the data object and the one or more other data objects, wherein the metadata includes one or more of:
the linking of the data object to the one or more other data objects;
a size;
a created time;
a last access time;
a region name;
a segment name;
a pillar width number;
a decode threshold number; and
a source name.

19. The computer readable storage medium of claim 15, wherein the modified header includes a size for the data object and the one or more other data objects, and wherein the conventional header includes the size of the single data object.

20. The computer readable storage medium of claim 15, wherein the second memory section stores further operational instructions, that when executed by the computing device, causes the computing device to determine the data object is the primary data object by:
   accessing metadata of the data object; and
   interpreting the metadata to determine the data object is the primary data object.

* * * * *